July 18, 1933. W. F. ROCKWELL 1,918,932
VEHICLE DRIVE
Filed May 29, 1928 2 Sheets-Sheet 1
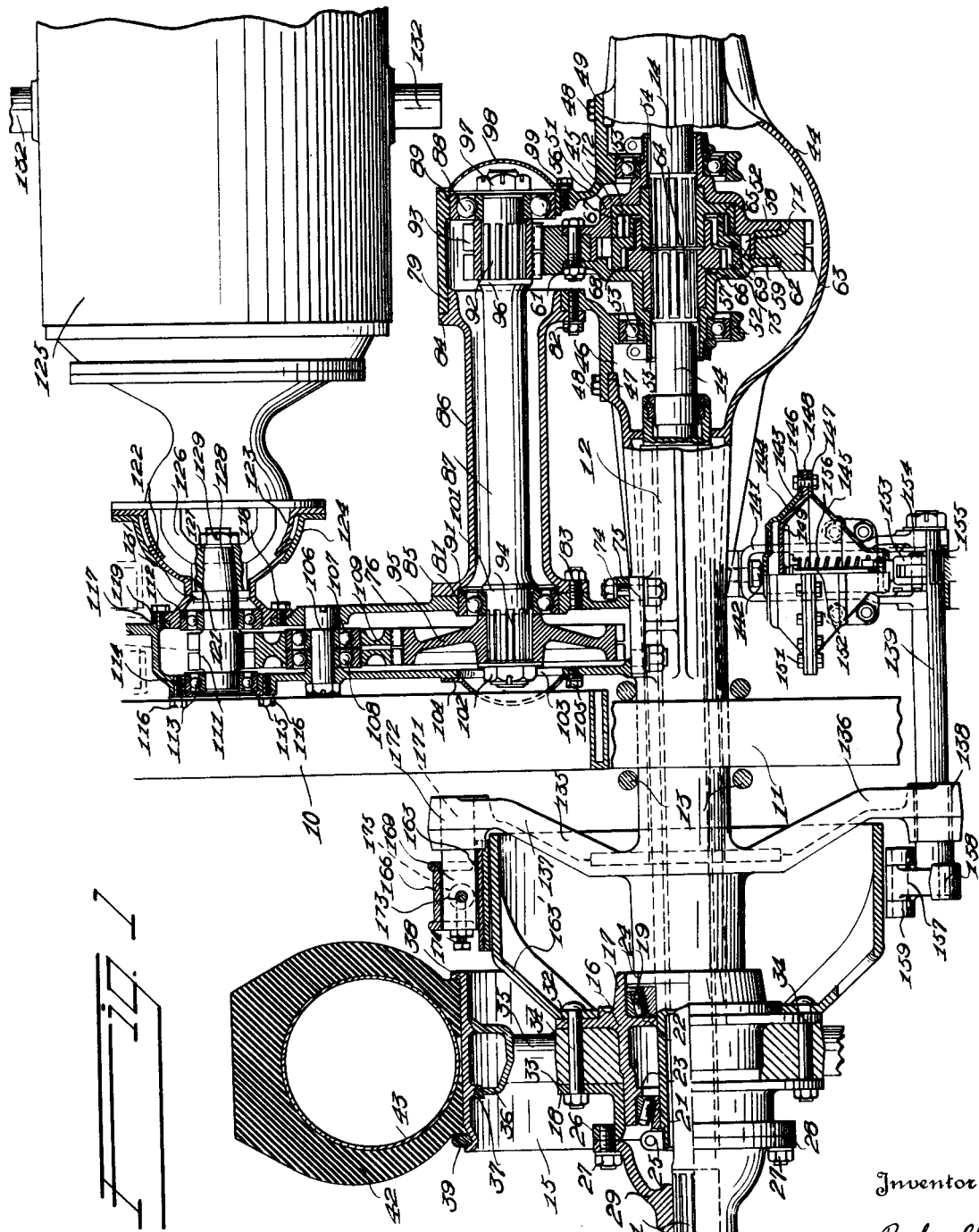
Inventor
Willard F. Rockwell
By William A. Strauch
Attorney

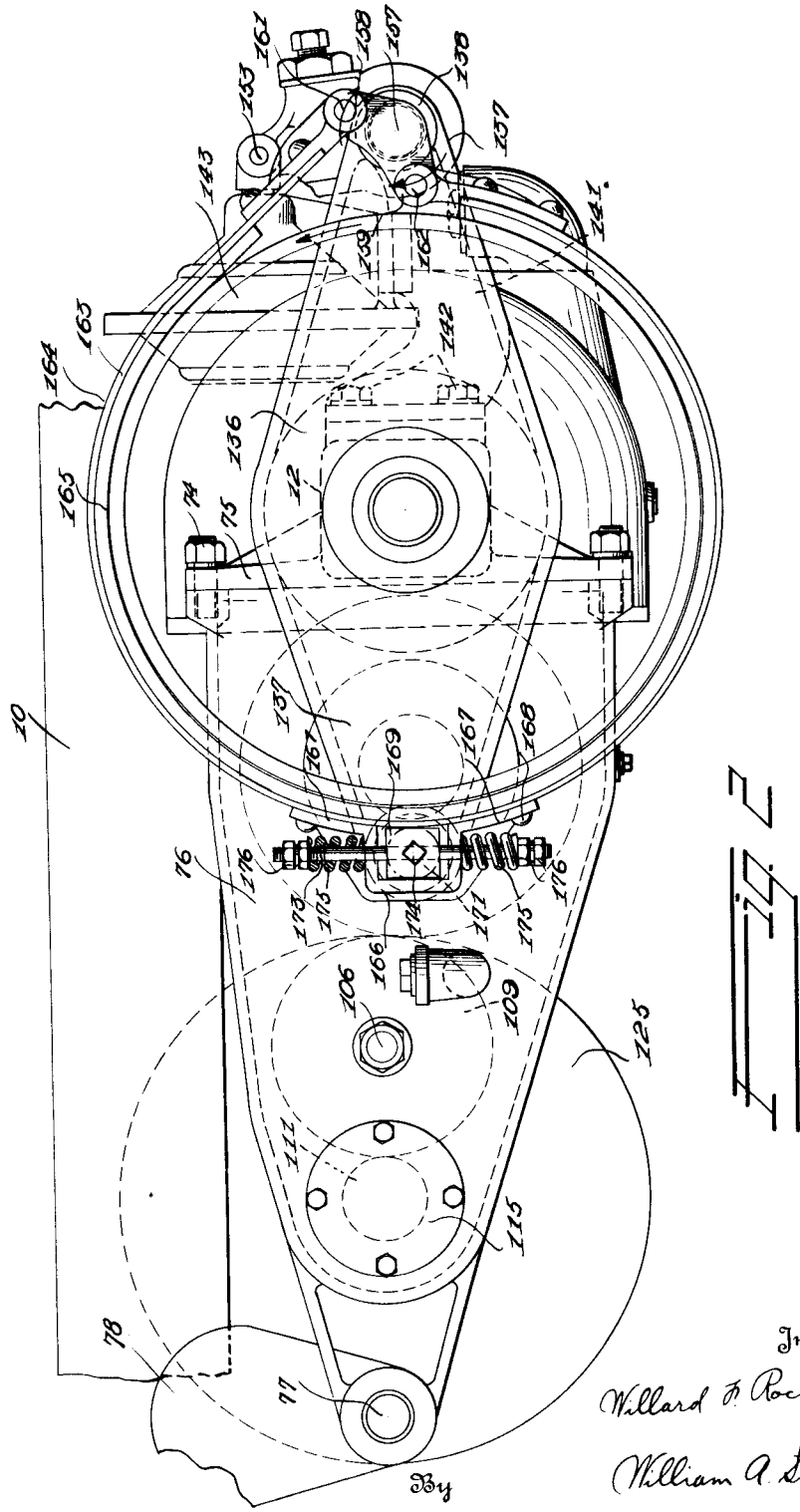

Patented July 18, 1933

1,918,932

UNITED STATES PATENT OFFICE

WILLARD F. ROCKWELL, OF EDGEWOOD, PENNSYLVANIA, ASSIGNOR, BY MESNE ASSIGNMENTS, TO THE TIMKEN-DETROIT AXLE COMPANY, OF DETROIT, MICHIGAN, A CORPORATION OF OHIO

VEHICLE DRIVE

Application filed May 29, 1928. Serial No. 281,531.

The present invention relates to a vehicle drive and brake construction.

More specifically the invention relates to an electric drive for vehicles embodying a flexible power transmission mechanism that permits movement of the axle with respect to the frame carried motor without substantial losses of power, and novel brake constructions embodying cushioning and equalizing means.

It is a primary object of this invention to provide vehicle driving means so disposed and arranged that movement of the drive axle housing will not affect the alignment of or induce strains in said means.

It is a further object of the invention to provide vehicle driving means embodying power transmitting reduction gearing operatively journaled in a torque arm in the form of a housing for the reduction gearing.

It is a further object of this invention to provide a driving connection between a drive axle and a frame supported electric motor, including reduction gearing compactly carried by said axle, and including a flexible connection between said motor and said gearing that permits free relative movement between the axle and frame within the limits permitted by the spring suspension employed.

It is a further object of the invention to provide vehicle driving means comprising an axle housing, drive axle sections disposed in said housing and operatively associated with a differential mechanism, a housing secured to said axle housing, a torque arm secured to said axle housing, a tubular housing connecting said last housing and said torque arm, power transmitting means operatively journaled in said housing and said arm, and a frame carried motor flexibly connected to said torque arm adjacent the flexible connection of the latter to the frame.

It is a still further object of this invention to provide novel brake mechanism for a vehicle comprising unit brake bands of a length sufficient to engage brake drums throughout substantially their entire periphery, that are associated with brake drums, carried by the wheels of said vehicle, and yieldable brake band centering and equalizing means associated with each band.

A still further object of the invention is to provide an axle construction intended for use with an electric motor in which the axle construction embodies the gearing necessary to drive the axle at a speed substantially less than the speed of the motor shaft and in which all of the gearing is compactly arranged and so disposed that identical or interchangeable axle sections may be used on both sides of a differential disposed centrally of the vehicle.

A further object of the invention is to utilize an elongated gear housing as a torque arm to resist the reactions due to the driving torque that tend to rotate the axle housing about its longitudinal axis.

With the foregoing objects in view, as well as others that will appear from the following disclosure, reference will be had to the accompanying drawings forming a part thereof, and in which—

Figure 1 is a fragmental horizontal sectional view of a preferred embodiment of the driving mechanism and associated parts forming part of my invention.

Figure 2 is a side elevational view of the structure shown in Figure 1, the wheel, brake band and respective axle being omitted.

Referring to the drawings by reference characters, in which like characters designate like parts, 10 designates a portion of the vehicle frame to which the body is secured. Yieldably supported from frame 10 by means of suitable springs 11 is a rear axle housing 12, springs 11 being secured to housing 12 by suitable clips 13 in well known manner. Rotatably mounted in housing 12 is a pair of drive axle sections 14 to the outer end of each of which is secured a drive wheel 15 (only one of which is illustrated. Axle sections 14 are of the same length and of precisely the same form, so that said sections are interchangeable and a single form of axle section may be used either at the right or left hand end of the axle housing. Each wheel 15 comprises a hub 16 consisting of an inner member 17 and an outer member 18. Inner member 17 is rotatably journaled on the outer end of housing 12 by means of roller bearings 19 and 21. Inwardly extending flanges 22 and 23 are provided on member 17 for engagement with the inner faces of bearings 19 and 21. Bearing 19 is held against flange 22 by a flange 24 on housing 12. Bearing 21 on the outer face thereof is engaged by a clamp nut 25 threaded on the end of housing 12 and which holds the assembled hub 16 and bearings 19 and 21 in operative position on said housing. Member 18 of hub 16 is provided with a flange 26 to which is secured, by means of screw bolts 27, a flange 28 of a member 29 that is splined to adjacent drive axle section 14 as indicated at 31 whereby the rotation of axle section 14 is imparted to hub 16 and the wheel carried thereby. Secured between outwardly extending flanges 32 and 33 of members 17 and 18 respectively by means of bolts 34 is a spoke structure 35 which at the outer ends thereof support a channeled felly 36 to which is secured in any well known manner, as by means of a wedge ring 37, a rim 38. Rim 38 has secured to it by means of a ring 39 engaging in the outer edge of said rim, a tire casing 42 provided with an inner tube 43. It will be understood that the other axle section 14 is provided with a similar wheel 15 supported and operatively connected to the other identical axle section 14 in the same manner.

Housing 12 is, as in usual practice, provided intermediate the ends thereof with an enlargement 44 for the reception of a differential 45 and by means of which differentiated rotation is imparted to axle sections 14. Housing 12 at the front thereof adjacent enlargement 44 is provided with an opening 46 surrounded by a flat circular flange 47 to which is secured by means of bolts 48 a recessed flange 49 of a housing 51. The recess in flange 49 provides surfaces at right angles to each other for cooperation with the flat top and edge of flange 47 to assist in positioning and properly locating housing 51 with respect to housing 12.

Housing 51 is provided with a pair of bearing supports 52 projecting inwardly from said housing and preferably constituting an integral part thereof. In each of said supports is supported a ball bearing 53, the inner races of which are engaged with sleeve like extensions 54 and 55 of gear supporting and housing members 56 and 57 forming the enclosing case of differential gears 45. The construction shown is that disclosed in patent to John Krohn #1,483,606, February 12, 1924, and in which members 56 and 57 are provided with peripheral flanges 58 and 59 between which are secured, by means of bolts 61, rib 62 of herringbone drive gear 63. Splined to the inner ends of axles 14, as indicated at 64, are gears 65 and 66 the former of which is provided with internal teeth 67 and the latter of which is provided with external teeth 68. From the case comprising members 56 and 57 the drive is taken by a central member 69 in the form of a ring substantially Z-shaped in section and which has on its periphery a number of slightly rounded square lugs 71 engaging loosely with notches machined in member 56 adjacent rib 62.

The lugs 71 of the central member or combination gear plate have at all times a solid bearing against some of the faces of the notches without lost motion or back lash, but lateral clearance between the two members is provided, thus permitting motion in a small circular path. This construction permits the central member to occupy any suitable eccentric position around its circular path but still maintain its driving connection with the case. Central member 69 carries on one side an external gear 72 for cooperation with teeth 67 and an internal gear 73 for cooperation with teeth 68.

There are therefore, two external-internal gear sets of the eccentric type driving the axle sections 14 and any relative angular motion between them must necessarily be in the reverse direction because the drive of one set is in internal mesh with an external gear while the drive of the other is in external mesh with an internal gear. The gear teeth are of prolate cycloidal form which provides for the relative movements of the cooperating gears.

The differential construction disclosed is well adapted to the specific drive construction disclosed forming the subject matter of this application but it will be apparent, however, that the usual form of differential such as disclosed in the patent to W. F. Rockwell #1,571,801 may be used in place of that described.

Secured to housing 12 intermediate differential housing 44 and one of the wheels 15 by means of bolts 74 engaged therewith and oppositely extending flanges 75 of housing 12 is one end of a torque arm 76 which is in the form of a casing as illustrated in Figure 1. The opposite end of torque arm 76 is pivotally secured at 77 to a bracket 78 depending from frame 10.

Housing 51 and torque arm 76 are provided with transversely aligned apertures 79 and 81 to the margins of which are secured by means of bolts 82 and 83 flanges 84 and 85 of a tubular housing 86 in which is rotatably mounted a shaft 87 one end of which is journaled in a ball bearing 88 located in an aperture 89 in housing 51 and the opposite end of which is journaled in a ball bearing 91 located in aperture 81 of arm 76. Splined to the inner end of shaft 87 at 92 is a herringbone pinion 93 in mesh with gear 63 before referred to. Splined to the outer end of shaft 87 at 94 within arm 76 in a herringbone gear 95. Pinion 93 engages a flange 96 on shaft 87 and bearing 88 engages the opposite face of pinion 93. Both pinion 93 and bearing 88 are maintained on shaft 87 by means of a nut 97 engaging the threaded end of shaft 87 and serving to clamp them against flange 96. A cap 98 encloses bearing 88 and nut 97. Said cap is secured to housing 51 by bolts 99. Bearing 91 has one face thereof in engagement with a flange 101 of shaft 87 and is engaged on the opposite face by gear 95 and said bearing and gear are maintained in position by means of a nut 102 engaging the outer threaded end of shaft 87. Said end may project through an aperture 103 in the outer wall of arm 76, in which event the aperture is closed by means of a cap 104 secured in position by bolts 105, permitting ready access to shaft 87 and the parts carried thereon.

Extending transversely of and secured in the opposite walls of arm 76 forwardly of gear 95 is a shaft 106 on which is rotatably journaled through ball bearings 107 and 108 an idler gear 109 which is in mesh with a herringbone pinion 111 journaled in ball bearing assemblies 112 and 113, the latter of which is seated in an aperture 114 in the outer wall of arm 76 which aperture is closed by means of a plate 115 secured in position by means of bolts 116. Secured to arm 76 about the margin of an aperture 117 in the inner wall thereof by means of bolts 118 is a flange 119 of a guide and housing member 121 provided with an inwardly directed spherical shaped flange 122 the outer end of which projects between similarly shaped flanges 123 and 124 projecting outwardly from the casing on electric motor 125, whose shaft has flexibly secured thereto by a universal joint, arms 126 carrying at their outer ends a sleeve 127 through which shaft 128 of pinion 111 extends. The centers of the universal joint in the motor drive shaft and members 122, 123 and 124 are substantially coincident. A nut 129 engages the inner end of shaft 128 to hold it in assembled relation to sleeve 127. The outer end of sleeve 127 engages a flange 131 on shaft 128. Sleeve 127 and shaft 128 being suitably secured as by means of a key for simultaneous rotation.

Motor 125 is pivotally secured beneath the body of the vehicle by means of trunnions 132 extending from opposite sides of the motor and resting in suitable seats or brackets carried by the body or suitable swinging links may connect motor 125 with the underside of the body.

In operation of the drive mechanism above described, when motor 125 is set into operation, shaft 128 is rotated through arms 126 and sleeve 127 imparting a rotation to pinion 111, which meshing with idler gear 109 imparts rotation thereto at reduced speed. Gear 109 in turn imparts rotation to gear 95 with which it is in mesh at further reduced angular velocity. Gear 95 through shaft 87 imparts rotation to pinion 93 which in turn imparts rotation at further reduced speed to differential gear 63. The latter through gears 65, 66 and 71 imparts rotation to drive axle sections 14 to which drive wheels 15 are secured. The train of gears interposed between motor 125 and axles 14 it will be noted, are so proportioned that the axle sections will be rotated at a speed that is considerably reduced and most of the gearing is housed in the torque arm 76.

Torque arm 76 being pivoted at 77 to frame 10 permits vertical movement of housing 12 due to road irregularities so far as permitted by the springs 11, but resists the tendency of the housing, due to the driving torque reactions, to rotate about the axis of axle sections 14, and as the entire gear mechanism is supported in housings 12 and 51 and arm 76 which move simultaneously with housing 12 about pivot 77 of arm 76, the train of gears will always be maintained in operative position without any tendency to disalignment or strain in any of the driving mechanism. The pivotal connection of motor 125 through trunnions 132 permits the shifting of the motor drive shaft angularly as the axle 12 and the torque arm 76 carried thereby tilts and moves toward and from the frame as permitted by the springs that connect the axle to the frame. The coincident universal joints between the motor casing and the torque arm and between the motor shaft section and the shaft section 128 permit free flexing about the center of said joints under conditions of service. Inasmuch as the motor drive shaft oscillates in a plane parallel to the axis of the axle no substantial tendency to lengthen and shorten the shaft as the axle moves toward and from the frame is introduced. As a result, the drive shaft need not be extensible and losses of power common in constructions including endwise extensible shafts is avoided.

Carried by housing 12, adjacent each end thereof and inward of the respective wheels 15 is a bracket 135 comprising rearwardly and forwardly extending arms 136 and 137 respectively. Rotatably journaled in bearing 138 of arm 136 of each bracket 135 is the outer end of a shaft 139 whose inner end is journaled in a bracket 141 secured to housing 12 by bolts 142.

Supported on each bracket 141 is a fluid pressure housing 143 comprising sections 144 and 145 between the flanges 146 and 147 of which the margin 148 of a flexible diaphragm 149 is secured by means of bolts 151. Extending longitudinally of housing 143 and having one end thereof secured to diaphragm 149 is a rod 152 whose opposite or rear end is pivoted at 153 to links 154 splined to shaft 139 at 155 whereby upon longitudinal movement of rod 152 shaft 139 will be rotated. Surrounding rod 152 and engaging diaphragm 149 at one end thereof is a helical compression spring 156 which normally urges diaphragm 149 forwardly or in inoperative position. Each housing 143 is adapted to receive fluid pressure back of its respective diaphragm 149 from a common or main fluid reservoir upon operation of control mechanism by the operator in well known manner.

Rigidly secured to the outer end of each shaft 139 is the central portion of an angular lever 157 provided with arms 158 and 159 pivotally secured as at 161 and 162 to the ends of a brake band 163 co-operating with a drum 163' secured to wheel 15 by bolts 34 and comprising an outer metallic band 164 and an inner friction band 165 as in common practice.

Secured to each brake band 163 intermediate the ends thereof and substantially diametrically opposite lever 157 as shown in Figure 2, is a channel member 166 provided with oppositely extending flanges 167 which engage and are secured to band 163 by rivets 168. Loosely mounted in the channel of each member 166 is a bar 169 rectangular in section and provided with a cylindrical end portion 171 rotatably journaled in a bearing 172 carried by arm 137. Extending vertically through bar 169 is a rod 173 which is rigidly and adjustably secured in bar 169 by means of a set screw 174 extending longitudinally of bar 169 and which is slidably mounted in member 166. Encircling each end of rod 173 is a helical spring 175 whose inner ends engage member 166 and whose outer ends are engaged by nuts 176 adjustably threaded on opposite ends of rod 173 for adjustably compressing springs 175.

In operation of the brake mechanism described, upon rearward movement of rods 152 through fluid pressure on diaphragm 149, shafts 139 are rotated through links 154 which in turn cause arms 158 and 159 of levers 157 to turn clockwise as indicated by arrows in Figure 2, thus drawing the ends of brake band 163 inward relative to shafts 139 and consequently drawing brake band 163 into engagement with drum 163' for arresting rotation of wheel 15. As member 166 is yieldingly maintained in a balanced position relative to bar 169 through springs 175, the brake band will be yieldingly constrained against rotary motion and will accordingly grip drum 163' uniformly throughout the extent thereof and any tendency to rotation thereof will be cushioned by springs 175, there being sufficient play between member 166 and bar 169 to permit band 163 to engage drum 163' at this point.

From the foregoing disclosure it will be seen that an electric drive for vehicles is provided comprising a motor and power transmitting reduction gearing interposed between the motor and drive axle housing, said motor and power transmitting gearing being so mounted that they are free to move correspondingly with any movement of the axle housing relative to road irregularities and that a torque arm is provided for the axle housing which also encases a part of the reduction gearing thus effecting a double function.

It will further be seen that the entire power transmitting mechanism is carried by the axle housing and is movable therewith about a single pivotal point thus always maintaining the power transmitting mechanism in operative alignment without danger of any strain therein and that the motor is flexibly connected to the power transmitting mechanism thus providing an efficient and comparatively simple flexible drive construction.

It will further be seen that a brake construction is provided which provides a cushioning and equalizing action of the brake bands relative to the drums with which they co-operate and that the brake reactions are effectively resisted by the torque arm. The springs 175 serve to maintain the brake band from permanently shifting its position circumferentially of the drum so that each end thereof will automatically return to the same position after each actuation of the brake operating mechanism. The springs 156 cause the shaft 139 to move reversely after the brake actuating mechanism is released and such reverse movement of shaft 139 shifts the arms 158 and 159 to their original position, said arms serving to withdraw the band from the drum.

Having set forth one specific embodiment of my invention it is to be understood that I am not limited thereto but am at liberty to make such changes or alterations as fairly fall within the scope of the annexed claims. Accordingly, what I claim as new and desire to secure by U. S. Letters Patent is:

1. Means for driving drive wheels of a vehicle comprising drive axle sections operatively connected to said wheels; a housing enclosing said axle sections; a differential in said housing and connected to said axles; a power unit mounted on said vehicle transversely of the latter and adjacent said housing; and reducing gearing interposed between said power unit and said differential, said gearing being movable as a unit with said housing about a point independent of said power unit mounting.

2. In combination with the body of a vehicle, an axle housing yieldably connected to said body; drive wheels rotatably journaled on the ends of said housing; drive axle sections rotatably journaled in said housing and operatively connected with said drive wheels; a differential for said axles in said housing; a power unit flexibly supported by said body; a power transmitting and reducing gearing assembly movable as a unit with said housing and interposed between and operatively connected with said differential and said power unit; said assembly embodying gearing having a universal connection with said power unit at a point offset from the longitudinal center line of the vehicle.

3. The construction defined in claim 2 in which said power transmitting and reducing gearing assembly includes a torque arm rigidly secured to the axle housing at one end and pivotally secured to said body at its other end at a point offset from the vehicle center line and substantially aligned transversely with said universal connection.

4. A drive axle construction for vehicles comprising a chassis; a housing; interchangeable drive axle sections supported in said housing; drive wheels secured to said drive axle sections; a differential in said housing for said axle sections; and driving means for said differential; said driving means including a driving unit pivoted on said chassis, and gearing connected to said unit and disposed on shafts extending substantially parallel to said axle sections, and movable bodily with said housing about a pivot in proximity to the pivotal support of the said driving unit.

5. Driving means for a road vehicle comprising an axle housing; a differential in said housing; interchangeable drive axle sections operatively connected to said differential; means for imparting movement to said differential; a motor having a drive shaft disposed parallel to said axle sections supported by said vehicle; and a universal joint connection between said motor and said movement imparting means.

6. The construction defined in claim 5 in which said means is operatively supported in a hollow torque arm secured to said axle housing at one end and pivotally attached to said vehicle adjacent its other end.

7. Drive means for a vehicle comprising an axle housing; drive axle sections supported in said housing; a torque arm carried by said housing and pivotally connected adjacent one side of the frame of said vehicle at a point relatively close to said housing; driving mechanism for said axle sections operatively carried by said torque arm and movable therewith about said pivotal connection; a driving motor pivotally suspended from said vehicle in proximity to said torque arm; and a universal connection between said motor and said driving mechanism.

8. In a motor vehicle construction having a chassis including a frame; a drive axle housing carrying drive wheels and supporting one end of said frame; a differential associated with said housing; a motor and housing therefor supported by said one end of the frame adjacent said axle housing; driving mechanism connected between said motor and said differential; said mechanism including a universal joint at an end of the motor shaft; and means supporting said mechanism and pivoted to said frame at a point relatively close to said universal joint in order to permit the axle housing to swing up and down without restriction when passing over road irregularities.

9. In the apparatus defined in claim 8, said universal joint being offset relative to the longitudinal center line of the vehicle, and said means for supporting the driving mechanism being rigid and fixed unsymmetrically on the axle housing in order to prevent tilting of the latter under the influence of driving and braking reactions.

10. In a motor vehicle construction having a chassis including a frame; a drive axle housing carrying drive wheels and supporting one end of said frame; a differential associated with said housing; a motor and housing therefor supported by said frame adjacent said housing; driving mechanism connected between said motor and said differential; said mechanism including a universal joint at an end of the motor shaft; a housing carrying said driving mechanism and a spherical-type universal connection between the latter housing and said motor housing adjacent said universal joint; said spherical connection having its primary axis normally parallel to that of the axle housing in order to permit transverse tilting of said axle housing and said motor housing with respect to each other as the wheels pass over road irregularities.

11. In a road vehicle construction, a frame; an axle housing, with a differential mechanism between its ends, resiliently supporting said frame; an L-shaped casing disposed horizontally and comprising an arm parallel to said housing and non-rotatively connected thereto adjacent said differential mechanism, and a second arm projecting longitudinally of said frame, rigidly connected to said parallel arm and flexibly connected at its free end to said frame; and driving mechanism housed within said casing and connected to said differential mechanism, said driving mechanism comprising a drive shaft housed within one of said arms and a gear train housed within the other of said arms and operatively connected to said drive shaft.

12. In the apparatus defined in claim 11, said first mentioned arm being rigidly secured to said housing adjacent said differential mechanism, whereby said housing, casing and driving mechanism may swing bodily as a unit relative to said frame, and whereby said casing serves to transmit torque reactions from the housing to the frame.

13. In a vehicle construction, a chassis frame; drive wheels arranged at and supporting one end of said frame; driving mechanism connected to said wheels; an electric motor pivotally suspended from said frame independently of said wheels and on a substantially horizontal axis arranged longitudinally of the vehicle; said motor having a drive shaft arranged transversely of the vehicle; and a universal coupling between said motor drive shaft and said wheel-driving mechanism.

14. In a road vehicle construction, a vehicle body; a wheel-supported axle arranged beneath said body and resiliently supporting the latter; a motor supported from said body in proximity to said axle and provided with a drive shaft parallel to said axle; and driving mechanism, including reduction gearing, connected between said shaft and said axle and designed to swing as a unit with said axle relative to said body; said motor comprising an electric motor pivotally connected to said body; and a universal connection between said motor drive shaft and said driving mechanism.

WILLARD F. ROCKWELL.